United States Patent
Treloar et al.

(10) Patent No.: US 11,067,473 B2
(45) Date of Patent: Jul. 20, 2021

(54) SYSTEM AND METHOD FOR HIGH VOLTAGE LEAK DETECTION

(71) Applicant: Packaging Technologies and Inspection, LLC, Hawthorne, NY (US)

(72) Inventors: Ross Treloar, Tuckahoe, NY (US); Andrew O'Sullivan, Brooklyn, NY (US); Heinz Wolf, Hackettstown, NJ (US)

(73) Assignee: PACKAGING TECHNOLOGIES & INSPECTION, LLC, Hawthorne, NY (US)

(*) Notice: Subject to any disclaimer, the term of this patent is extended or adjusted under 35 U.S.C. 154(b) by 125 days.

(21) Appl. No.: 16/434,546

(22) Filed: Jun. 7, 2019

(65) Prior Publication Data

US 2020/0386650 A1     Dec. 10, 2020

(51) Int. Cl.
| G01M 3/40 | (2006.01) |
| G01M 3/26 | (2006.01) |
| G01M 3/04 | (2006.01) |
| G01M 3/16 | (2006.01) |
| G01N 27/00 | (2006.01) |
| G01N 27/60 | (2006.01) |

(Continued)

(52) U.S. Cl.
CPC ............... G01M 3/40 (2013.01); G01M 3/02 (2013.01); G01M 3/045 (2013.01); G01M 3/16 (2013.01); G01M 3/26 (2013.01); G01N 27/00 (2013.01); G01N 27/007 (2013.01); G01N 27/205 (2013.01); G01N 27/60 (2013.01);

(Continued)

(58) Field of Classification Search
CPC ............ G01M 3/40; G01M 3/02; G01M 3/26; G01M 3/045; G01M 3/16; G01M 3/12; G01M 3/24; G01M 3/06; G01M 3/20; G01N 27/205; G01N 27/007; G01N 27/00; G01N 27/60

See application file for complete search history.

(56) References Cited

U.S. PATENT DOCUMENTS

| 4,125,805 A * | 11/1978 | Nagamatsu | G01M 3/40 324/558 |
| 7,038,464 B2 * | 5/2006 | Holzer | G01M 3/40 324/456 |

(Continued)

FOREIGN PATENT DOCUMENTS

| JP | 2004264190 A * | 9/2004 |
| WO | 2013011329 A2 | 1/2013 |

(Continued)

OTHER PUBLICATIONS

English translation for JP2004264190A (Year: 2004).*
International Search Report and Written Opinion issued in PCT application No. PCT/IS20/26398, dated Jul. 21, 2020.

*Primary Examiner* — Peter J Macchiarolo
*Assistant Examiner* — Fatemeh Esfandiari Nia
(74) *Attorney, Agent, or Firm* — Benesch, Friedlander, Coplan & Aronoff LLP

(57) ABSTRACT

A leak detection system includes a testing interface, which includes a rotation holder configured to retain and rotate a package. The testing interface includes a plunger apparatus configured to actuate a plunger to apply a pressure to the package before and/or during the package being inspected using a high voltage leak detection (HVLD) apparatus. The testing interface also includes a controller configured to operate and coordinate the operation of the testing interface with operation of the HVLD apparatus.

14 Claims, 7 Drawing Sheets

(51) Int. Cl.
*G01N 27/20* (2006.01)
*G01M 3/02* (2006.01)
G01M 3/12 (2006.01)
G01M 3/24 (2006.01)
G01M 3/06 (2006.01)
G01M 3/20 (2006.01)

(52) U.S. Cl.
CPC ............... *G01M 3/06* (2013.01); *G01M 3/12* (2013.01); *G01M 3/20* (2013.01); *G01M 3/24* (2013.01)

(56) References Cited

U.S. PATENT DOCUMENTS

| | | | |
|---|---|---|---|
| 2003/0047005 A1 | 3/2003 | Stalnaker et al. | |
| 2004/0051537 A1* | 3/2004 | Hori | G01N 27/205 324/557 |
| 2005/0104599 A1* | 5/2005 | Otsuka | G01M 3/40 324/519 |
| 2006/0042357 A1* | 3/2006 | Holzer | G01M 3/40 73/40 |
| 2013/0118233 A1* | 5/2013 | Dzikowicz | G01M 3/40 73/49.3 |
| 2018/0100824 A1* | 4/2018 | Asselin | B07C 5/34 |

FOREIGN PATENT DOCUMENTS

| | | | | |
|---|---|---|---|---|
| WO | WO-2013011329 A2 * | 1/2013 | ............. | G01M 3/40 |
| WO | 2017136007 A1 | 8/2017 | | |
| WO | 2019157036 A1 | 8/2019 | | |

* cited by examiner

SYSTEM AND METHOD FOR HIGH VOLTAGE LEAK DETECTION

FIELD

The present disclosure relates to systems and methods for high voltage leak detection.

BACKGROUND

High voltage leak detection (HVLD) is one of the emerging technologies for inspecting leakage. HVLD operates by applying a high voltage potential to an electrically conductive substance inside non-conductive package or container. Defects are identified when the electrical discharges are detected between the substance inside the package and HVLD electrodes. For example, a HVLD testing process may include of a set of electrodes scanning a sealed package containing a liquid. The presence of a current flow or voltage between the set of electrodes indicates a breach of the package closure, which may be attributed by the presence of a crack, a pin hole, or a seal imperfection.

SUMMARY

In one embodiment, a leak detection system includes a testing interface, which includes a rotation holder configured to retain and rotate a package. The testing interface includes a plunger apparatus configured to actuate a plunger to apply a pressure to the package before and/or during the package being inspected using a high voltage leak detection (HVLD) apparatus. The testing interface also includes a controller configured to operate and coordinate the operation of the testing interface with operation of the HVLD apparatus.

In another embodiment, a testing interface for high voltage leak detection (HVLD) inspection includes a rotation holder configured to retain and rotate a package. The testing interface includes a plunger apparatus configured to actuate a plunger to apply a pressure to a stopper of the package before and/or during the package being inspected using a HVLD apparatus. The stopper is configured to fit within the package and seal an opening of the package.

In another embodiment, a method for high voltage leak detection (HVLD) inspection includes providing a HVLD apparatus configured to inspect the package using an inspection electrode and a detection electrode. The method includes providing a testing interface including a rotation holder and a plunger apparatus. The method includes mounting the package on the testing interface, wherein the package includes a stopper configured to fit within the package and seal an opening of the package. The method includes rotating the package using the rotation holder and applying a pressure on the stopper in an inward direction using the plunger apparatus. The method also includes inspecting the package using the HVLD apparatus.

The summary is provided merely for purposes of summarizing some example embodiments so as to provide a basic understanding of some aspects of the disclosure. Accordingly, it will be appreciated that the above-described examples should not be construed to narrow the scope or spirit of the disclosure in any way. Other examples, embodiments, aspects, and advantages will become apparent from the following detailed description taken in conjunction with the accompanying drawings.

DETAILED DESCRIPTION

The present disclosure is not limited in terms of the particular embodiments described in this application, which are intended as illustrations of various aspects only. Many modifications and variations can be made without departing from the scope of the invention, as will be apparent to those skilled in the art. Functionally equivalent methods within the scope of the disclosure, in addition to those enumerated herein, will be apparent to those skilled in the art from the following descriptions. Such modifications and variations are intended to fall within the scope of the appended claims. The terminology used herein is for the purpose of describing particular embodiments only, and is not intended to be limiting.

The present disclosure is related to systems and methods for high voltage leakage detection (HVLD), e.g., manufactured by Packaging Technologies and Inspection, LLC. In some examples, the systems and/or methods seek to reduce the detectable defect size and/or to improve the reliability of HVLD detection. The presence of a current flow or voltage between the inspecting electrodes can indicate a breach of the package closure, which may be attributed to the presence of a crack, a pin hole, or a seal imperfection. However, there are challenges associated with detecting small or partially filled defects. For example, defects may be too small or at least partially filled by non-conductive substances, such that the liquid contained within the package cannot establish a current path through the small or at least partially filled defects. As a result, even when defects are present, no current flow or voltage is detected, leading to inaccurate or unreliable leakage detection.

In an example, when HVLD inspection is performed to detect 2 micron (μm) laser drilled defects at the shoulder of an 1 milliliter (mL) prefilled syringe (PFS) sealed by a rubber stopper, the defects at the shoulder of the PFS may not be accurately detected. In particular, a layer of silicon on the inside of the syringe may be clotting the defects, leading to inaccurate detection. Accordingly, systems and methods described herein are configured to overcome the drawbacks set forth above. The systems and methods described herein may include applying a pressure to the package or the stopper before and/or during the HVLD inspection. The increased internal pressure may aid the liquid egressing through a defect if one is present, thus improving the reliability and accuracy of the HVLD inspection.

Figure 1:
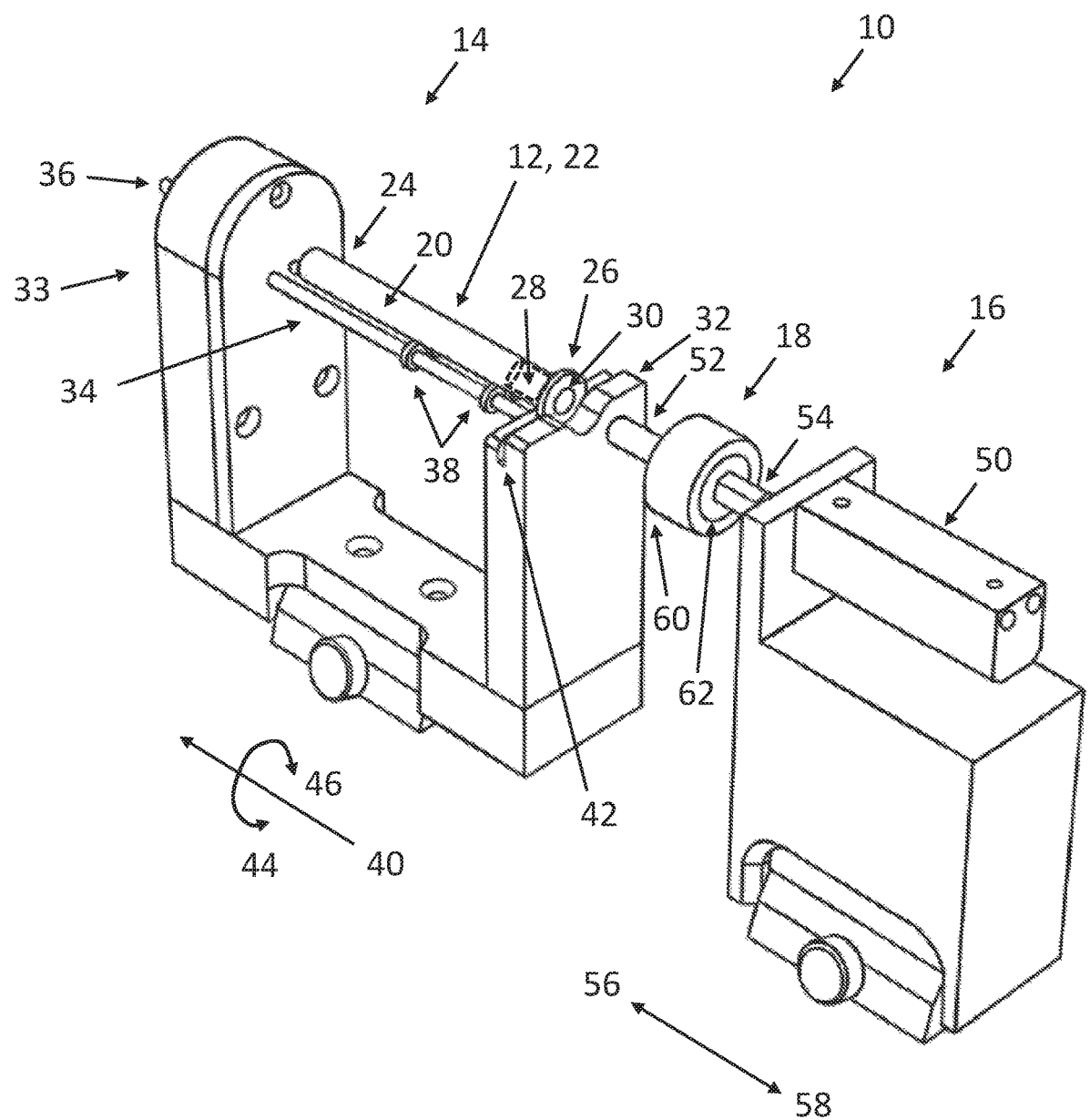
FIG. 1 shows a perspective view of an example testing interface including a plunger apparatus and a rotation holder retaining a syringe.

FIG. 1 shows a perspective view of an example testing interface 10 configured to apply a pressure to a package 12 in accordance with an embodiment of the present disclosure. The testing interface 10 may include a rotation holder 14 configured to retain and rotate the package 12. The testing interface 10 may include a plunger apparatus 16 configured to actuate a plunger 18 to contact and apply a pressure to the package 12 before and/or during the package 12 being inspected using a high voltage leak detection (HVLD) apparatus. In some examples, the plunger 18 contacts and applies a pressure to the package 12 immediately before HVLD testing.

The package 12 may have any suitable shapes and may be made of any suitable non-conductive material (e.g., polymer, glass, ceramic, composites, etc.) to contain a liquid 20 within the package 12. In the illustrated embodiment, the package 12 is a syringe 22 having a first distal end 24 and a second distal end 26, and includes a stopper 28 configured to fit within the syringe 22 and seal an opening 30 of the syringe 22. The stopper 30 may be made of any suitable non-conductive material and may be in any suitable shape to form a tight interference fit with an inner surface of the syringe 22 and to seal the opening 30. For example, the stopper 30 may be a rubber stopper having a cylindrical shape with a diameter substantially equal to or slightly greater than the diameter of the opening 30. The stopper 30 may have a diameter slightly greater than the diameter of the opening 30 to form an interference fit with the opening 30.

In the illustrated embodiment, the rotation holder 14 includes a retainer 32 configured to retain the syringe 22 and a rotation mechanism 33 configured to rotate the syringe 22. The rotation mechanism 33 may include one or more shafts 34 coupled to a driver shaft 36 driven by a motor. The rotation mechanism 33 may also include one or more rollers 38 disposed to surround at least a portion of the one or more shafts 34. When the syringe 22 is retained by the rotation holder 14, the syringe 22 rests on the retainer 32 and the one or more shafts 34 (e.g., in contact with the one or more rollers 38). The longitudinal direction of the one or more shafts 34 is substantially parallel to a longitudinal direction or scan direction 40 of the testing interface 10.

In some embodiments, the retainer 32 may include a mating interface 42 to retain the syringe 22 from the second distal end 26. The mating interface 42 may have a shape conformed to the second distal end 26 of the syringe 22 to receive the second distal end 26 and restrict any motion of the syringe 22 in the longitudinal direction 40. For example, the mating interface 42 may include a recess or groove to receive a radial protrusion at the second distal end 26 of the syringe 22, such that the syringe 22 can rotate in a first rotational direction 44 or a second rotational direction 46, but cannot move in the longitudinal direction 40 when the syringe 22 is retained by the rotation holder 14. In some embodiments, the mating interface 42 may be made of any suitable material or include a coating to reduce friction between the mating interface 42 and the syringe 22 when the syringe 22 rotates.

The driver shaft 36 may couple to a motor and is configured to drive rotation of the one or more shafts 34 in the first rotational direction 44 or the second rotation direction 46. The one or more rollers 38 are configured to rotate with the one or more shafts 34 (e.g., the one or more rollers 38 are non-rotationally coupled to the one or more shafts 34) and contact the syringe 22 to drive rotation of the syringe 22. The roller 38 may be a ring or an O-ring that tightly conforms to the shaft 34. The roller 38 may be made of any suitable material, such as rubber and polymer, to provide sufficient friction to drive rotation of the syringe 22. Furthermore, the one or more rollers 38 and the syringe 22 are configured to rotate in opposite directions. For example, the one or more shafts 34 and the one or more rollers 38 rotating in the first rotational direction 44 drives the syringe 22 to rotate in the second rotational direction 46, or vice versa.

The plunger apparatus 16 may include the plunger 18 and an actuator 50 configured to actuate the plunger 18 to apply a pressure to the package 12 (e.g., the syringe 22). In the illustrated embodiment, the plunger 18 includes an end effector 60 at a distal end 52 configured to contact the syringe 22, and the plunger 18 also includes a plunging rod 54 coupled to the actuator 50 to move the end effector 60 towards and away from the syringe 22. The plunger 18 may be removably coupled to the actuator 50. The plunger 18 may be electrically conductive or non-conductive, and may be made of any suitable materials, such as metal, metal alloy, polymer, ceramic, composite, or any combinations thereof. The distal end 52 of the plunger 18 has a dimension suitable to contact and apply a pressure to the second distal end 26 of the syringe 22. For example, the distal end 52 of the plunger 18 may have a diameter or characteristic length smaller than the inner diameter of the opening 30 of the syringe 22. The distal end 52 of the plunger 18 may have any suitable shape and any suitable dimensions. For example, the distal end 52 of the plunger 18 may have any suitable shape and dimensions to provide suitable pressure or force to the package 12. In some embodiments, distal end 52 of the plunger 18 may have a diameter or characteristic length of about 5 millimeter (mm) to about 7 mm, about 5.5 mm to about 6.5 mm, about 5.8 mm to about 6.2 mm, about 6.1 mm, or about 6.0 mm.

The actuator 50 may be a linear actuator to actuate the plunger 18 moving in a first or an inward direction 56 toward the package 12 or in a second or an extracting direction 58 away from the package 12. The actuator 50 may be any suitable types of actuator, including but are not limited to, a pneumatic actuator, a solenoid actuator, and a lead screw.

In some embodiments, the plunger 18 may include an end effector 60 at the distal end 52. The end effector 60 may be configured to contact and rotate with the package 12. For example, the end effector 60 may include a bearing 62 or any other suitable mechanism that is non-rotatably coupled to the distal end 52, and is rotatably coupled to the plunging rod 54. When the end effector 60 is in contact with the package 12 (e.g., the syringe 22), the end effector 60 (e.g., the distal end 52 and the bearing 62) rotates with the package 12. In other examples, the distal end 52 does not rotate with the package 12, e.g., the distal end is not connected with a rotatable bearing 62 and moves away from the package 12 after applying pressure to the package 12 and before the testing interface 10 begins, or continues, rotating the package 12. The testing interface 10 may also include any suitable mounting features 66 to enable the testing interface 10 to be coupled to or interfaced with a HVLD apparatus, e.g., an optical rail.

In operation, the actuator 50 actuates the plunger 18 to contact the second distal end 26 of the package 12. The pressure exerting on the package 12 is predetermined by the applied force divided by the contact area between the package 12 and the plunger 18. The applied pressure may cause the internal pressure of the package 12 (e.g., the syringe 22) to increase. For example, a pressure applied to the stopper 28 in the inward direction 56 may cause the stopper 28 to compress and/or may cause the fluid 20 and/or air inside the package 12 to exert a pressure (e.g., outward pressure, shear stress) on the internal surface of the package 12. These internal pressure may clear the clogged defects and/or help the liquid 20 to flow through the defects, thereby improving the reliability and accuracy of the HVLD inspection and even defects of very small sizes may be detected.

Figure 2:
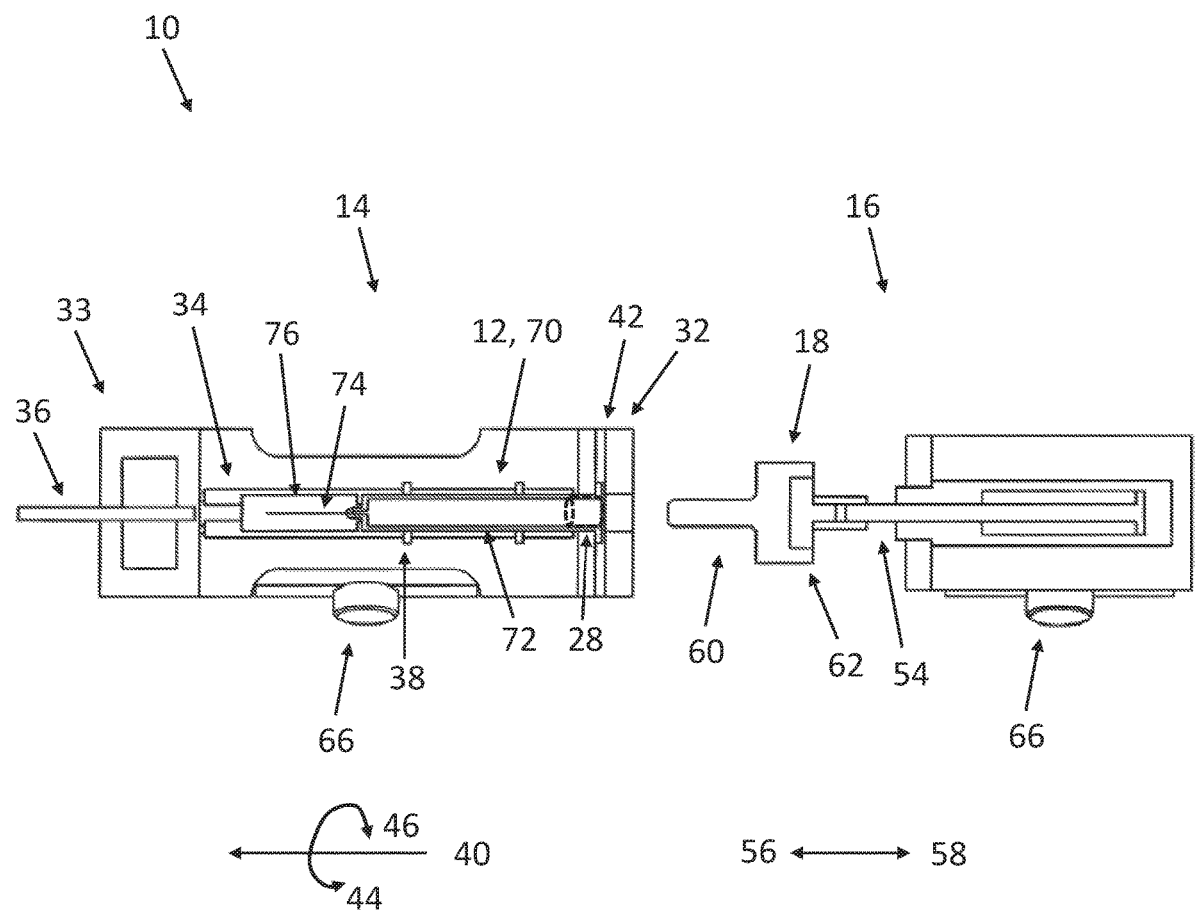
FIG. 2 shows a top view of the testing interface of FIG. 1 including the plunger apparatus and the rotation holder retaining a needle syringe.

In some embodiments, as shown in FIG. 2, the package 12 may be a needle syringe 70 including a barrel 72, a needle 74, and a needle cap 76. FIG. 2 shows a top view of the needle syringe 70 retained by the testing interface 10. In the illustrated embodiment, the needle syringe 70 rests on top of the one or more shafts 34. The barrel 72 is retained by the retainer 32. For example, the radially protruding edge of the barrel 72 is received by the mating interface 42 (e.g., a recess or groove), such that the needle syringe 70 may rotate in the first or second rotational direction 44 or 46, but cannot move in the longitudinal direction 40 even when a pressure is applied on the stopper 28 by the plunger 18.

Figure 3:
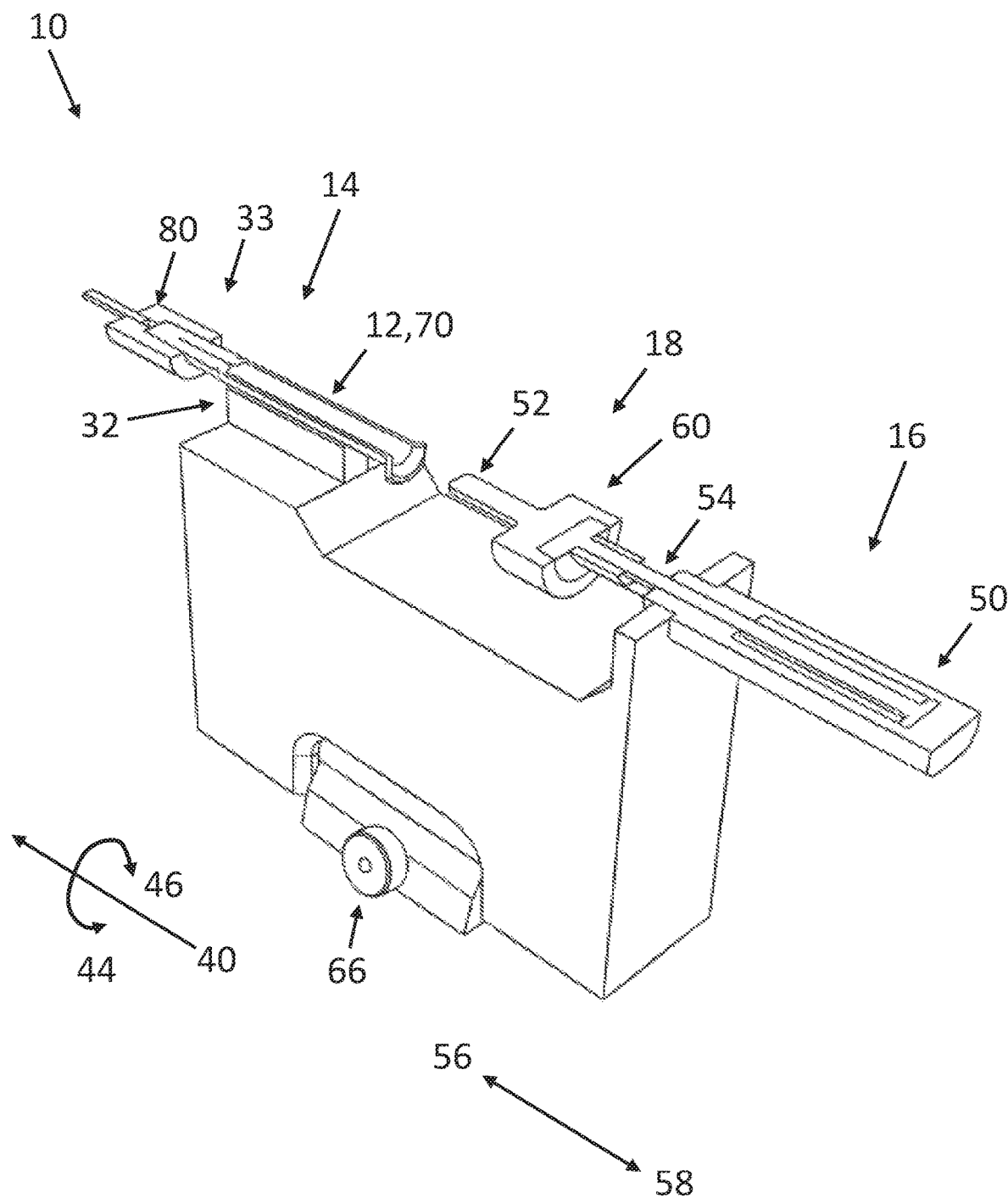
FIG. 3 shows a perspective view of an example testing interface including a plunger apparatus and a rotation holder constructed as one integral piece.

In some examples, the rotation holder and the plunger apparatus may be constructed as one integral piece. FIG. 3 shows an perspective view of the package 12 (e.g., the needle syringe 70) retained by the testing interface 10 having the rotation holder 14 and the plunger apparatus 16 in one integral piece. In the illustrated embodiment, the needle syringe 70 is retained by the retainer 32 and is coupled/retained by the rotation mechanism 33. The rotation mechanism 33 may include a spinner 80 configured to retain and rotate the needle syringe 70 in the first rotational direction 44 or the second rotational direction 46. The retainer 32 may be configured to allow the needle syringe 70 to rotate easily with a very low or substantially zero friction. The spinner 80, the retainer 32, or both, may be configured to restrain the needle syringe 70 from moving in the longitudinal direction 40. In some embodiments, the retainer 32 may be omitted and the spinner 80 is configured to retain and rotate the package 12 (e.g., the needle syringe 70).

Figure 4:
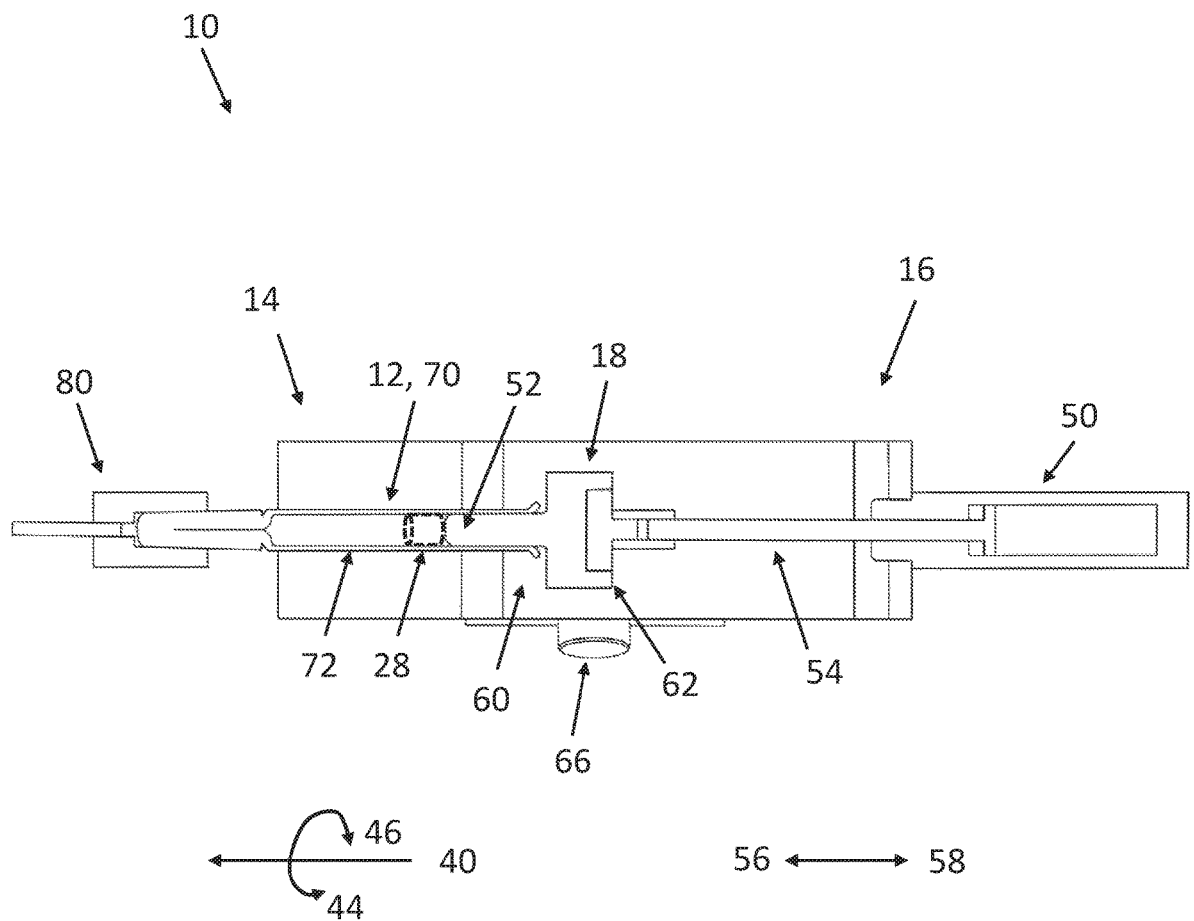
FIG. 4 shows a top view of the testing interface of FIG. 3.

FIG. 4 shows a top view of the package (e.g., the needle syringe 70) retained by the resting interface 10, and the plunger 18 is actuated by the actuator 50 to contact and apply a pressure to the stopper 28 disposed inside the barrel 72. The distal end 52 of the plunger 18 has a diameter or characteristic length smaller than the inner diameter of the barrel 72. The distal end 52 inserts into the barrel 72 to apply a pressure to the stopper 28.

Figure 5:
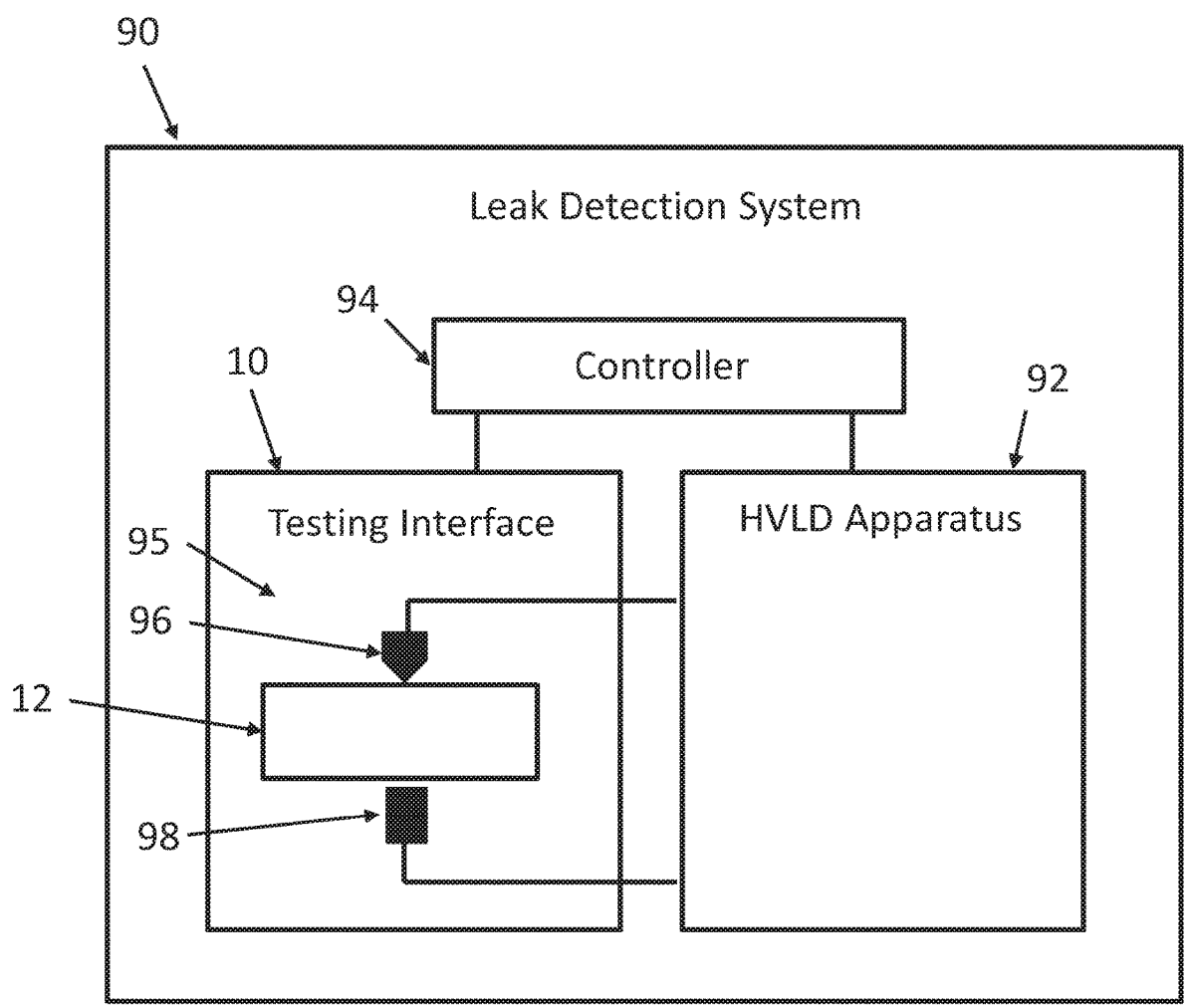
FIG. 5 shows a diagram of a leak detection system including a testing interface and a HVLD apparatus.

The testing interface 10 may be used in combination with any suitable HVLD apparatus to help improve the reliability and accuracy of the HVLD inspection. FIG. 5 is a diagram showing a leak detection system 90 including the testing interface 10, a HVLD apparatus 92, and a controller 94 operatively and communicatively coupled to the testing interface 10 and the HVLD apparatus 92.

The controller 94 may be configured to operate and coordinate the operation of the testing interface 10 with operation of the HVLD apparatus 92. In some embodiments, the controller 94 may also be configured to operate the HVLD apparatus 92. The controller 94 may include any suitable processer (e.g., microprocessor, MOSFET, IGBT, etc.) and memory. The controller 94 may include any suitable user interface and/or display to allow a user to program and/or provide inputs to control operations of the testing interface 10, the HVLD apparatus 92, or both. For example, the controller 94 may receive instructions from a user or may be pre-programmed to inspect the package 12 following certain procedures or predetermined procedures.

The HVLD apparatus 92 may be any suitable leak detection circuit or apparatus to perform leak inspection on the package 12. In the illustrated embodiment, the HVLD apparatus 92 may include a scanner 95 (e.g., E-Scan TM) including an inspection electrode 96 and a detection electrode 98 to inspect the package 12. The inspection electrode 96 and the detection electrode 98 are configured to be positioned near and/or contact opposite sides of the package 12 and scan across the package 12 (e.g., in the longitudinal direction or scan direction 40 in FIGS. 1-4) to inspect the package 12.

Figure 6:
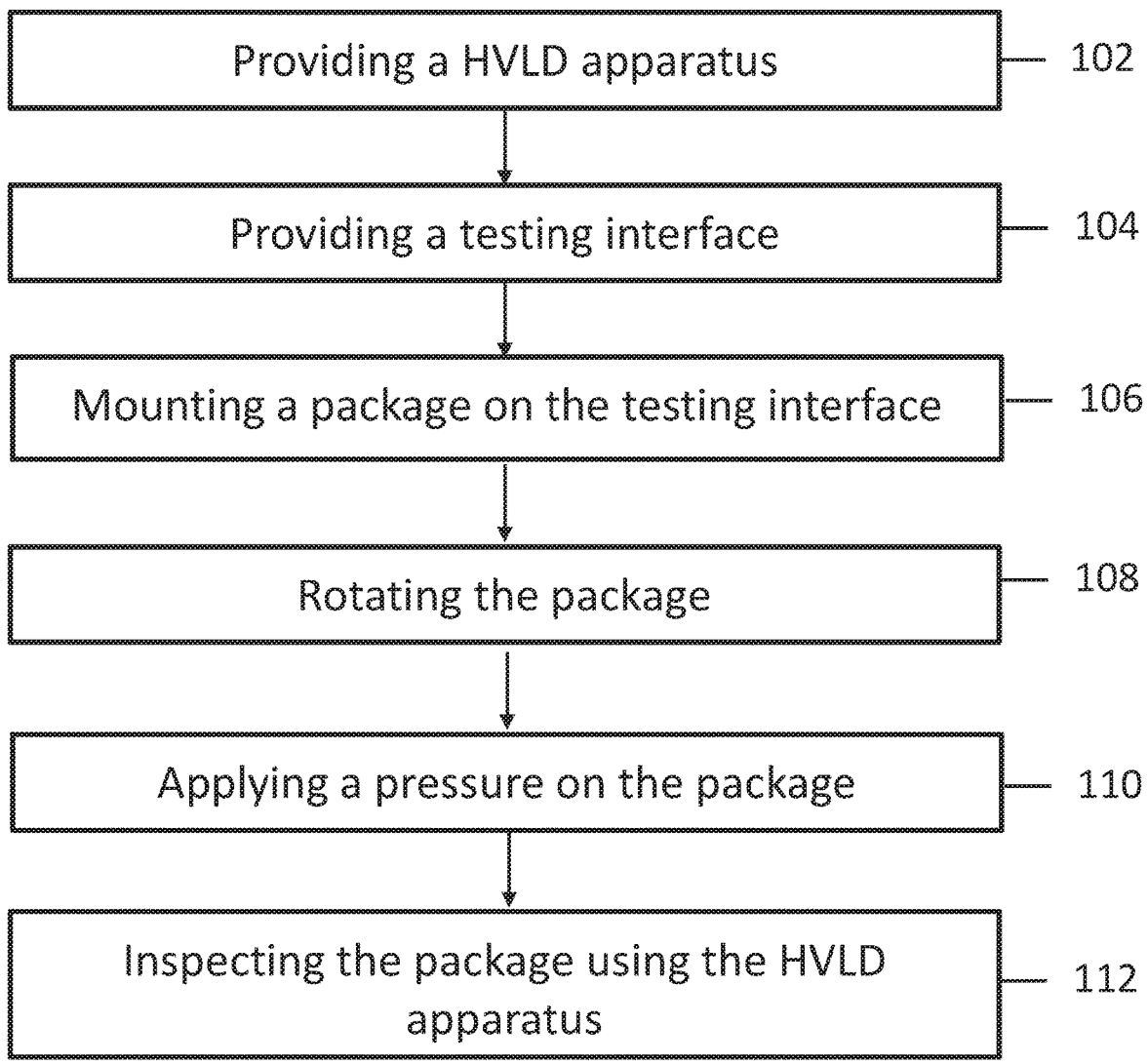
FIG. 6 shows an example method for HVLD inspection using the leak detection system of FIG. 5.

FIG. 6 shows a method 100 for inspecting a package using the leak detection system 90. The steps discussed herein may be controlled and executed by the controller 94. The method 100 may include providing 102 a HVLD apparatus configured to inspect a package using a scanner comprising an inspection electrode and a detection electrode. For example, step 102 may include providing the HVLD apparatus 92, which may include the scanner 95 including the inspection electrode 96 and the detection electrode 98.

The method 100 may include providing 104 a testing interface (e.g., the testing interface 10) and may include mounting 106 the package (e.g., the package 12) on the testing interface. The testing interface 10 may be oriented/positioned in proximity of the HVLD apparatus 92 to allow inspection or may be coupled to the HVLD apparatus 92 using the mounting features 66.

The method 100 may include mounting 106 the package on the testing interface 10. In some embodiments, step 106 may include mounting the package 12 (e.g., the syringe 22, the needle syringe 70) on the retainer 32 and the one or more shafts 34 of the rotation holder 14. In some embodiments, step 106 may include mounting the package 12 (e.g., the syringe 22, the needle syringe 70) on the spinner 80 and/or the retainer 32 of the rotation holder 14. The package 12 may include a stopper (e.g., the stopper 28) configured to fit within the package 12 and seal the package 12. The package 12 is pre-filled with a liquid (e.g., the liquid 20).

The method 100 may include rotating 108 the package 12 using the rotation holder 14 in the first rotational direction 44 or the second rotational direction 46 and in any suitable speed.

The method 100 may include applying 110 a pressure on the package 12 before and/or during the testing. For example, step 110 may include actuating the plunger 18 to move in the longitudinal direction 40 to contact and apply a pressure on the package 12 (e.g., on the stopper 28). The applied pressure may be a predetermined value based on the size of the stopper 28, the size of the package 12, the fitting and/or friction between the stopper 28 and the inner surface of the package 12, the mechanical properties of the stopper 28, the mechanical properties of the package 12, the dimension or size of the plunger 18, the contact area between the plunger 18 and the stopper 28, or a combination thereof. In some embodiments, the pressure may be greater than a first threshold to sufficiently compress the stopper 28 and/or the liquid or air inside the package 12. The pressure may be below than a second threshold that may cause deformation or breaking of the package 12. In some embodiments, the pressure may be below a third threshold that may cause a displacement of the stopper 28. In some embodiments, the force applied to the package 12 or the stopper 28 is about 15 Newton (N) or about 187.5 kilopascal (kPa). In some embodiments, a sufficient force is applied to the stopper 28 to maintain 1 rib or less movement of the stopper 28.

Figure 7A:
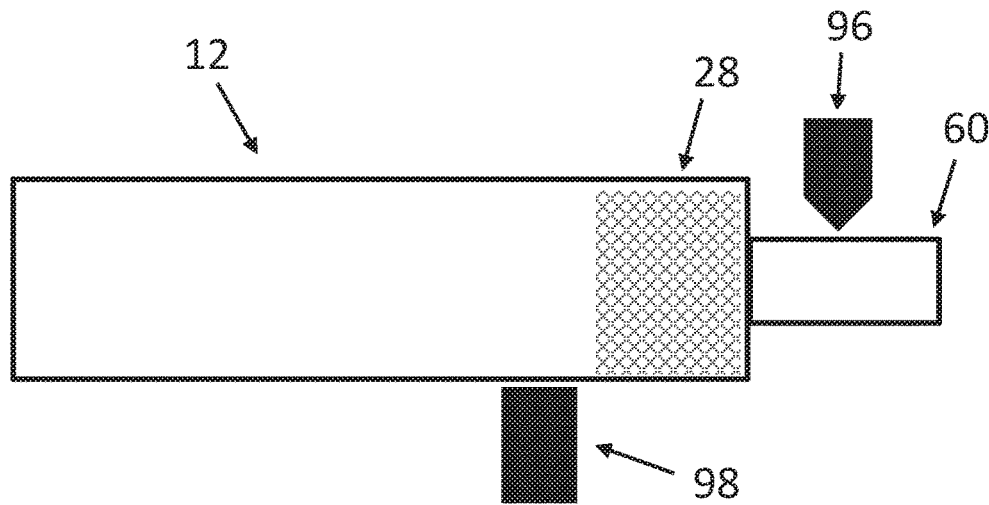
FIGS. 7(a) and 7(b) show schematics illustrating example processes of inspecting a package using the leak detection system of FIG. 5.
Figure 7B:
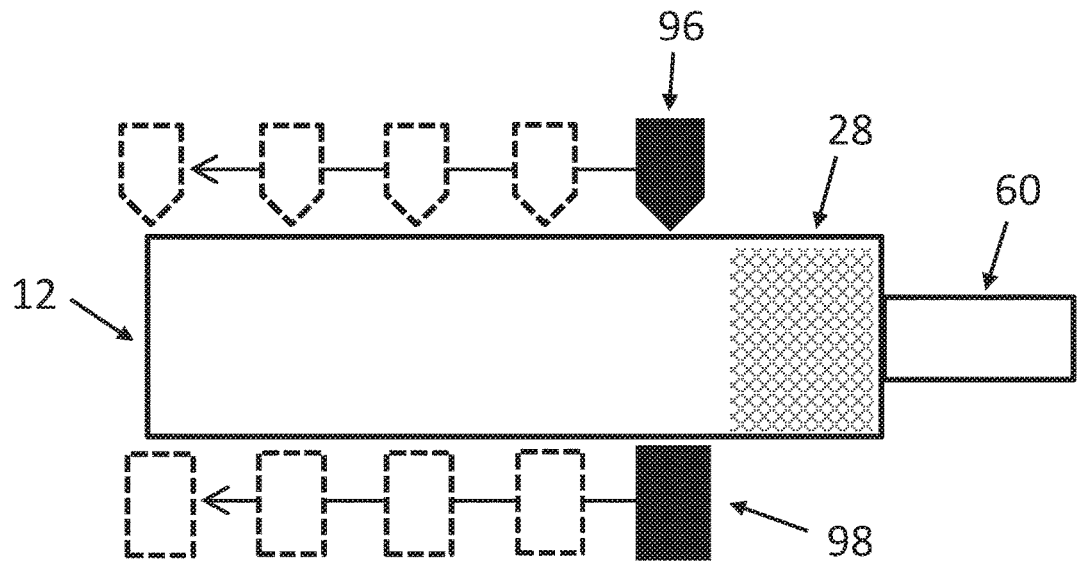

The method 100 may include inspecting 112 the package 12 using the HVLD apparatus 92. FIGS. 7(a) and 7(b) show schematics illustrating example processes of step 112. For example, step 112 may include moving the inspection electrode 96 and the detection electrode 98 near or to contact the package 12 on opposite sides of the package 12, and moving the inspection and detection electrodes 96 and 98 across the desired inspecting portions of the package 12 (see, e.g., FIGS. 7(a) and 7(b)). The inspection and detection electrodes 96 and 98 may move in the longitudinal or scan direction 40. The inspection and detection electrodes 96 and 98 may move together at substantially the same speed or may move at different speeds. The desired inspecting portions may include the stopper 28 and/or any other portions of the package 12.

In some embodiments, step 112 may include inspecting the stopper 28 (see, e.g., FIG. 7(a)) and inspecting the rest of the package 12 (see, e.g., FIG. 7(b)). Inspecting the stopper 28 may include moving the electrically conductive end effector 60 of the plunger 18 near or to contact the stopper 28, moving the inspection electrode 96 near or to contact the end effector 60, moving the detection electrode 98 near or to contact the package 12, and taking HVLD measurements when the stopper 28 is between the inspection and detection electrodes 96 and 98 (see, e.g., FIG. 7(a)). Inspecting the rest of the package 12 may include moving the inspection electrode 96 near or to contact the package 12 on the opposite side of the detection electrode 98, and moving the inspection and detection electrodes 96 and 98 at substantially the same speed across the package 12 (e.g., from the second distal end 26 to the first distal end 24) while taking HVLD measurements (see, e.g., FIG. 7(b)). In some embodiments, the plunger 18 (e.g., the end effector 60) may be moved away or retracted from the stopper 28 before inspecting the package 12.

In some embodiments, applying the pressure on the package (step 110) may occur before and/or during inspecting the package (step 112). In some embodiments, the method 100 may include rotating the package (step 108) when the pressure is applied on the package (step 110). For example, the plunger apparatus 16 may include the end effector 60 with the bearing 62 to enable the end effector 60 to rotate with the package 12 (e.g., the stopper 28) while maintaining contact with the package. In some embodiments, the method 100 may include rotating the package (step 108) in absence of the applied pressure (e.g., step 108 and step 110 do not occur at the same time).

In a non-limiting example, the method 100 may include following steps in the order described:
 (a) rotating the package 12;
 (b) stopping rotation of the package 12, moving the electrically conductive plunger 18 (e.g., the end effector 60) to contact the stopper 28, moving the detection electrode 98 to contact the package 12, moving the inspection electrode 96 to contact the plunger 18, and taking HVLD measurements when the stopper 28 is between the inspection and detection electrodes 96 and 98 (see, e.g., FIG. 7(a));
 (c) rotating the package 12 while retracting the plunger 18 away from the package 12 and moving the inspection electrode 96 to contact the package 12 on the directly opposite side of the detection electrode 98;
 (d) moving the inspection and detection electrodes 96 and 98 at substantially the same speed from the second distal end 26 to the first distal end 24 while the package 12 is rotating and taking HVLD measurements (see, e.g., FIG. 7(b)); and
 (e) stopping rotation of the package 12 and retracting the inspection and detection electrodes 96 and 98.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The invention claimed is:

1. A leak detection system, comprising:
 a testing interface comprises:
 a rotation holder configured to retain and rotate a package;
 a plunger apparatus configured to actuate a plunger to apply a pressure to the package at least one of before and during the package being inspected using a high voltage leak detection (HVLD) apparatus, wherein the plunger apparatus is configured to apply the pressure to a stopper of the package, the stopper is configured to fit within the package and seal an opening of the package and rotate with the package, and the plunger apparatus comprises an end effector configured to contact and rotate with the package; and
 a controller configured to operate and coordinate the operation of the testing interface with operation of the HVLD apparatus.

2. The leak detection system of claim 1, wherein the rotation holder and the plunger apparatus are one integral piece.

3. The leak detection system of claim 1, wherein the plunger comprises metal, metal alloy, polymer, ceramic, composite, or any combinations thereof.

4. The leak detection system of claim 1, wherein the plunger is electrically conductive.

5. The leak detection system of claim 1, wherein the plunger apparatus comprises a linear actuator to actuate the plunger, the linear actuator comprises a pneumatic actuator, a solenoid actuator, or a lead screw.

6. A leak testing interface for high voltage leak detection (HVLD) inspection, comprising:
 a rotation holder configured to retain and rotate a package; and
 a plunger apparatus configured to actuate a plunger to apply a pressure to a stopper of the package before and/or during the package being inspected using a HVLD apparatus,
 wherein the stopper is configured to fit within the package and seal an opening of the package and the rotation holder and the plunger apparatus are two separate pieces, and
 the rotation holder comprises a rotating shaft coupled to one or more rollers configured to contact and rotate the package and the plunger apparatus comprises an end effector configured to contact and rotate with the package.

7. The leak testing interface of claim 6, wherein the rotation holder and the plunger apparatus are one integral piece and comprising a rotation mechanism to rotate the package from a distal end of the package.

8. The leak testing interface of claim 6, wherein the plunger comprises metal, metal alloy, polymer, ceramic, composite, or any combinations thereof.

9. The leak testing interface of claim 6, wherein the plunger is electrically conductive.

10. The leak testing interface of claim 6, wherein the plunger apparatus comprises a linear actuator to actuate the plunger, the linear actuator comprises a pneumatic actuator, a solenoid actuator, or a lead screw.

11. The leak testing interface of claim 6, comprising a controller configured to operate and coordinate the testing interface with operation of the HVLD apparatus.

12. A method for high voltage leak detection (HVLD) inspection, comprising:
 providing a HVLD apparatus configured to inspect the package using a scanner comprising an inspection electrode and a detection electrode;

providing a testing interface, comprising a rotation holder and a plunger apparatus;
mounting the package on the testing interface, wherein the package comprises a stopper configured to fit within the package and seal an opening of the package;
rotating the package using the rotation holder;
applying a pressure on the stopper in an inward direction using the plunger apparatus;
rotating the package when the pressure is applied and
inspecting the package using the HVLD apparatus, wherein inspecting the package comprises inspecting the stopper and inspecting the rest of the package.

13. The method of claim 12, comprising applying the pressure before and/or during inspecting the package.

14. The method of claim 12, comprising rotating the package in absence of the applied pressure.

* * * * *